United States Patent Office 3,297,766
Patented Jan. 10, 1967

3,297,766
SEMI-CONTINUOUS PROCESS FOR PREPARING 4,4'-SULFONYLDIPHENOL
Kenneth B. Bradley, Midland, Mich., and Lennis E. Record, Bridgeville, Pa., assignors to The Dow Chemical Company, Midland, Mich., a corporation of Delaware
No Drawing. Filed May 28, 1964, Ser. No. 371,078
2 Claims. (Cl. 260—607)

This application is a continuation-in-part of Application Serial No. 141,963, filed October 2, 1961, now abandoned.

This invention relates to a semi-continuous process for preparing 4,4'-sulfonyldiphenol.

There are known processes for preparing 4,4'-sulfonyldiphenol. However, these processes suffer from one or more deficiencies: the yield of 4,4'-sulfonyldiphenol is undesirably low, and frequently an undesirably high proportion of 2,4'-sulfonyldiphenol is obtained.

The deficiencies of the known processes have been overcome by the process of the present invention, wherein there is produced a high yield of 4,4'-sulfonyldiphenol of excellent purity and a proportionately low amount of 2,4'-sulfonyldiphenol.

These desirable results are obtained, according to the present invention, in a process wherein 4,4'-sulfonyldiphenol is prepared by reacting sulfuric acid with phenol, by the improvement of: cooling the reaction mixture to about 55–75° C., desirably about 55–65° C. and preferably about 60° C., separating the thus precipitated 4,4'-sulfonyldiphenol from the reaction mixture and recycling the liquor resulting from the separation to the reaction zone with additional quantities of sulfuric acid and phenol.

In the process of the present invention, the product prepared in each cycle consists principally of a mixture of 4,4'-sulfonyldiphenol and a small proportion of 2,4'-sulfonyldiphenol. When the said mixture is reacted with additional quantities of phenol and sulfuric acid, the major portion of the 2,4'-isomer rearranges to the 4,4'-isomer. This unexpected behavior results in a high conversion to the desired 4,4'- product, thus effecting a high yield of the latter isomer. Also, the yield of 4,4'-isomer increases with an increasing number of cycles, gradually approaching a limit of very nearly 100 percent.

The phenol and sulfuric acid, at the beginning of the process, are added conveniently in the proportions of from 3.25 to 8 moles of phenol per mole of acid, desirably from 3.5 to 4 moles per mole of acid. Greater proportions of phenol can be used but are not ordinarily desirable.

During the reaction the mixture of phenol and said is heated to from about 180° to 188° C. for a sufficient period of time to effect substantially maximum conversion to 4,4'-sulfonyldiphenol. Normally from 1–2 hours are sufficient to achieve maximum conversion.

At the conclusion of the reaction, the reaction mixture is cooled to 55–75° C., thus forming a slurry consisting of a solid phase that is essentially 4,4'-sulfonyldiphenol, and liquor that contains dissolved therein 4,4'-sulfonyldiphenol, 2,4'-sulfonyldiphenol and smaller amounts of other isomers, in addition to phenol.

After separating the 4,4'-sulfonyldiphenol from the reaction mixture, preferably by filtration, it is frequently advantageous to wash this product with water to remove traces of the liquor, the water preferably being preheated to at least about 60° C. The wash water can then be recycled to the reaction zone with the filtrate liquor.

The water that is continuously formed during the course of the reaction is conveniently removed in a continuous manner as an azeotrope with phenol and the phenol separated from the water and recycled. The reaction mixture is cooled to from about 55° C. to about 75° C. and the insoluble 4,4'-sulfonyldiphenol separated from the mixture, preferably by filtration. The 4,4'-sulfonyldiphenol is then preferably washed with steam or with water heated to at least about 60° C. to remove traces of the liquor and then dried. The liquor resulting from the separation of the 4,4'-sulfonyldiphenol from the reaction mixture and containing essentially all of the 2,4'-isomer that is produced in the reaction, and the wash liquor filtrate resulting from the washing of the product with water are combined and returned to the reactor where they are mixed with additional quantities of acid and phenol equivalent to the amount of 4,4'-sulfonyldiphenol removed. The preparation of the 4,4'-sulfonyldiphenol is then carried out in a semi-continuous manner by repetition of the reaction cycle previously described. At the conclusion of the process the liquors and the wash liquor filtrates can be distilled to recover the unreacted phenol. The crude sulfonyldiphenol product remaining from this distillation, if undesirably colored, may be added to aqueous alkali solution to convert the diphenol to the corresponding diphenate, the solution filtered, and the filtrate acidified with hydrochloric or sulfuric acid to reclaim the desired product in the diphenol form.

It is to be understood that in the novel process of the present invention, dilute sulfuric acid can be used as a reactant. However, this does not impart any advantage to the process and necessitates the removal of additional water from the reaction vessel. Therefore the use of concentrated acid as a reactant is preferred. It is also to be understood that the sulfuric acid employed as a reactant is essentially completely consumed in the reaction, and thus that no provision need be made for the removal of excess acid from the reaction vessel.

The process of the present invention is preferably carried out at atmospheric pressure. Superatmospheric pressures effect a higher reflux temperature, resulting in a lower yield of sulfonyldiphenol isomers and a higher proportion of by-products in the reaction mixture. Subatmospheric pressures can be utilized but require vacuum equipment, thus involving additional cost and inconvenience as compared to the use of atmospheric pressure.

The following example illustrates the practice of the present invention.

*Example 1*

658 grams of phenol and 202.6 grams of 66° Bé. sulfuric acid were charged to a 2-liter reactor and the reactor temperature was slowly raised to 180–187° C. during eight hours, and maintained at 187° C. for one hour, the water produced being continuously removed as an azeotrope with phenol and the phenol returned to the reactor during the reaction. The reaction mixture was cooled to 60° C. and filtered in a centrifuge, and the 4,4'-sulfonyldiphenol was water-washed by treatment with 0.2–.5 lb. of steam (which condensed in the presence of the product) per pound of product and dried. The filtrate resulting from filtration of the 4,4'-sulfonyldiphenol and the wash liquor filtrate resulting from the water washing were recycled to the reactor and quantities of phenol and sulfuric acid equivalent to the product removed were also added to the reactor. The mixture thus formed was heated to effect the sulfonation reaction and the resulting sulfonyldiphenol product separated by procedures similar to those just described. This cycle of operation for carrying out the reaction for the formation of sulfonyldiphenol was repeated a number of times. After the completion of the fourth cycle, the filtrate and wash liquor filtrate were distilled to recover phenol. There were thus obtained 184.2 grams of phenol.

The residue remaining from the above distillation was added to 717 grams of an aqueous sodium hydroxide solution containing 12 weight percent of sodium hydroxide. 5 grams of activated charcoal were added and the solution was heated for 1 hour at 100° C. The solution was then cooled, filtered and neutralized by adding 210 grams of concentrated HCl while stirring. The slurry thus produced was cooled to 30° C. and filtered and the solid was washed with 60 grams of water and dried. There were obtained 260 grams of sulfonyldiphenol product of which 156 grams, or 60 percent were the 4,4'-sulfonyldiphenol isomer, and 104 grams were 2,4'-sulfonyldiphenol. This is satisfactory for numerous sulfonyldiphenol applications wherein high purity 4,4'-sulfonyldiphenol is not required or this product may be mixed with additional phenol and sulfuric acid for the preparation of additional quantities of 4,4'-sulfonyldiphenol containing a smaller proportion of 2,4'-sulfonyldiphenol than obtained above.

An additional quantity of 4,4'-sulfonyldiphenol was obtained from the reactor after each of the four cycles, principally representing material that had adhered to the sides of the reactor. There were obtained a total of 130 grams of this additional product from the four cycles and it is shown in Table I.

There are also shown in Table I for each cycle, the amounts of phenol and sulfuric acid added, the amounts of 4,4'-isomer recovered by filtration and from the reactor.

TABLE I

| Cycle | Reactants Charged, g. | | 4,4'-sulfonyldiphenol Isolated, g. | |
|---|---|---|---|---|
| | Phenol | H₂SO₄ | By Filtration | Recovered from Reactor |
| 1 | 658 | 202.6 | 262 | 25 |
| 2 | 198 | 106.4 | 226 | 23 |
| 3 | 188 | 101.3 | 233 | 42 |
| 4 | 209 | 109.4 | 252 | 40 |
| Total | 1,253 | 519.7 | 973 | 130 |

Phenol recovered after 4th cycle, g. _____ 204.7
2,4'-recovered after 4th cycle, g. _____ 104

Yield, percent of theoretical, based on phenol consumed, 4,4'- _____ 79.3
Yield, percent of theoretical, based on phenol consumed, 2,4'- _____ 7.5

Total yield of diphenols _____ 86.8

At the end of the fourth cycle, after all 4,4'- and 2,4'- were isolated, 250 g. of the isomeric mixture obtained by conversion to the diphenate were added to the reactor in addition to phenol and sulfuric acid. The reaction was then conducted for three additional cycles, phenol and sulfuric acid being added for, and 4,4'-product being removed after, each cycle. The data is shown in Table II.

TABLE II

| Cycle | Reactants Charged, g. | | 4,4'-sulfonyldiphenol Isolated, g. | |
|---|---|---|---|---|
| | Phenol | H₂SO₄ | By Filtration | Recovered from Reactor |
| 5 | 470 | 101.3 | 183 | 32 |
| 6 | 161.7 | 87.1 | 239 | 23 |
| 7 | 197.4 | 106.4 | 283 | 60 |
| Total | 829.1 | 294.8 | 705 | 115 |

Phenol recovered after 7th cycle, g. _____ 204.7
2,4'-recovered after 7th cycle, g. _____ 104
Yield, percent of theoretical, based on phenol consumed in 7 cycles, 4,4'- _____ 86.3

We claim:
1. In a process wherein 4,4'-sulfonyldiphenol is prepared by reacting by contacting sulfuric acid with phenol at about 180 to about 188° C., the improvement of: cooling the reaction mixture to from about 55 to about 75° C.; separating the thus formed crystalline 4,4'-sulfonyldiphenol from the reaction mixture; returning the liquor resulting from the separation to the reaction zone; adding to said liquor additional quantities of sulfuric acid and phenol equivalent to the product removed; and repeating the process.
2. Process as in claim 1 wherein the reaction mixture is cooled to about 55°–65° C.

No references cited.

CHARLES B. PARKER, *Primary Examiner.*
D. R. PHILLIPS, *Assistant Examiner.*